US012692430B1

(12) United States Patent
Kalgaonkar et al.

(10) Patent No.: US 12,692,430 B1
(45) Date of Patent: Jul. 28, 2026

(54) METHODS FOR SEALING HIGH-PERMEABILITY ZONES IN SUBTERRANEAN FORMATIONS

(71) Applicant: SAUDI ARABIAN OIL COMPANY, Dhahran (SA)

(72) Inventors: Rajendra Arunkumar Kalgaonkar, Dhahran (SA); Vikrant Bhavanishankar Wagle, Dhahran (SA); Qasim Sahu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/235,904

(22) Filed: Jun. 12, 2025

(51) Int. Cl.
| | |
|---|---|
| *E21B 43/27* | (2006.01) |
| *C09K 8/508* | (2006.01) |
| *C09K 8/72* | (2006.01) |
| *C09K 8/76* | (2006.01) |
| *E21B 33/138* | (2006.01) |

(52) U.S. Cl.
CPC .............. *C09K 8/76* (2013.01); *C09K 8/5083* (2013.01); *C09K 8/725* (2013.01); *E21B 33/138* (2013.01); *E21B 43/27* (2020.05)

(58) Field of Classification Search
CPC ........ C09K 8/76; C09K 8/725; C09K 8/5083; E21B 43/27; E21B 33/138
See application file for complete search history.

(56) References Cited

U.S. PATENT DOCUMENTS

| | | | |
|---|---|---|---|
| 4,532,052 A | 7/1985 | Weaver et al. | |
| 4,600,057 A | 7/1986 | Borchardt | |
| 5,335,726 A | 8/1994 | Rodrigues | |
| 5,358,051 A | 10/1994 | Rodrigues | |
| 5,836,392 A | 11/1998 | Uriwin-Smith | |
| 6,187,839 B1 | 2/2001 | Eoff et al. | |
| 7,341,106 B2 | 3/2008 | Reddy et al. | |
| 7,641,106 B1 | 1/2010 | Kovacs et al. | |
| 7,891,424 B2 | 2/2011 | Creel et al. | |
| 8,985,212 B1 * | 3/2015 | Crespo .................. | C09K 8/588 166/305.1 |
| 9,284,798 B2 | 3/2016 | Jamison et al. | |

| | | | |
|---|---|---|---|
| 10,655,055 B2 | 5/2020 | Szalai et al. | |
| 10,889,749 B2 | 1/2021 | Kurian et al. | |
| 11,466,198 B2 | 10/2022 | Moradi-Araghi et al. | |
| 2008/0108524 A1 | 5/2008 | Willberg et al. | |
| 2013/0000900 A1 | 1/2013 | Kalgaonkar et al. | |
| 2016/0177693 A1 * | 6/2016 | Gomaa .................. | C09K 8/516 166/305.1 |
| 2016/0376490 A1 * | 12/2016 | Salla ..................... | C09K 8/508 166/305.1 |
| 2018/0362840 A1 * | 12/2018 | Meher .................... | C09K 8/905 |
| 2020/0002603 A1 * | 1/2020 | Eoff ......................... | C09K 8/72 |

OTHER PUBLICATIONS

Huckabee, Paul, et al., Evaluation and Management of Stimulation Placement Control in Cemented Sleeve Completions, Paper presented at the SPE Annual Technical Conference and Exhibition, San Antonio, Texas, USA, Oct. 2017.

Bai, Baojun, et al., A comprehensive review of polyacrylamide polymer gels for conformance control, Petroleum Exploration and Development, vol. 42, Issue 4, 2015.

Tessarolli, Fernanda G. C., et al. 'Hydrogels Applied for Conformance-Improvement Treatment of Oil Reservoirs'. Hydrogels, InTech, Aug. 1, 2018.

* cited by examiner

*Primary Examiner* — Silvana C Runyan
(74) *Attorney, Agent, or Firm* — Vorys, Sater, Seymour and Pease LLP

(57) ABSTRACT

Methods for sealing high-permeability zones in subterranean formations are disclosed. The methods involve introducing a treatment fluid comprising polyacrylamide, acid, and water into a subterranean formation containing high- and low-permeability zones. The treatment fluid preferentially enters high-permeability zones, where polyacrylamide remains inactive in acidic conditions but swells upon neutralization, thereby at least partially sealing these zones. This sealing diverts subsequent fluid flow into low-permeability zones, enhancing hydrocarbon recovery. In formations with water-producing zones, the polyacrylamide selectively absorbs water, reducing unwanted water production. The treatment fluid may also include additives such as corrosion inhibitors, intensifiers, iron stabilizers, and chelants to improve operational performance. The disclosed methods provide controlled zonal coverage and improved stimulation efficiency in carbonate reservoirs.

6 Claims, No Drawings

METHODS FOR SEALING HIGH-PERMEABILITY ZONES IN SUBTERRANEAN FORMATIONS

FIELD OF THE DISCLOSURE

The present disclosure relates generally to hydrocarbon production from subterranean formations and, more particularly, to compositions used to seal high-permeability zones in subterranean formations.

BACKGROUND OF THE DISCLOSURE

Hydraulic and acid fracturing are widely used techniques to enhance hydrocarbon production from tight and unconventional carbonate reservoirs. Carbonate formations, composed primarily of calcite, dolomite, or their mixtures, often exhibit heterogeneous permeability, meaning they contain both low-permeability zones, which restrict fluid flow, and high-permeability zones, such as natural fractures and vugular (cavity-filled) formations, which allow fluid to flow too easily. While fracturing fluids are designed to dissolve rock and create new pathways for hydrocarbons, these fluids tend to preferentially enter high-permeability regions, leaving low-permeability zones under-stimulated. This can result in inefficient stimulation, reducing overall hydrocarbon recovery.

To counteract this issue, fracture diversion techniques are used to redirect fracturing fluids into less permeable regions of a subterranean formation. One common approach involves particulate diversion agents, such as fibers, rock salts, or degradable particulates, which temporarily block high-permeability channels, allowing fluids to enter lower-permeability zones. However, these methods have limitations. Many diversion agents can prematurely block the wrong zones, including low-permeability formations, leading to suboptimal stimulation. Additionally, if the fracture extends into a water-producing zone, these conventional methods do not prevent water intrusion, resulting in unwanted water production that may reduce the efficiency of hydrocarbon extraction.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for sealing high-permeability zones in subterranean formations may comprise introducing a treatment fluid to a subterranean formation comprising a high-permeability zone and a low-permeability zone; wherein the treatment fluid comprises a polyacrylamide, an acid, and water; allowing the treatment fluid to enter the high-permeability zone; allowing the polyacrylamide to at least partially swell within the high-permeability zone, thereby at least partially sealing the high-permeability zone, thereby at least partially sealing the high-permeability zone; and diverting at least a portion of the treatment fluid to the low-permeability zone.

In another embodiment, methods for sealing high-permeability zones in subterranean formations may comprise introducing a treatment fluid to a subterranean formation comprising a high-permeability zone, a low-permeability zone, and a water-producing zone; wherein the treatment fluid comprises a polyacrylamide, an acid, and water; allowing the treatment fluid to enter the water-producing zone; allowing the polyacrylamide to at least partially swell within the water-producing zone, thereby at least partially sealing the water-producing zone; allowing the treatment fluid to enter the high-permeability zone; allowing the polyacrylamide to at least partially swell within the high-permeability zone, thereby at least partially sealing the high-permeability zone; diverting at least a portion of the treatment fluid to the low-permeability zone; and allowing the acid to at least partially fracture the low-permeability zone.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to hydrocarbon production from subterranean formations and, more particularly, to compositions used to seal high-permeability zones in subterranean formations. As mentioned previously, current fracture diversion methods, such as particulate diversion agents, may prematurely block low-permeability zones, leading to suboptimal stimulation and inefficient hydrocarbon recovery. Additionally, such methods may not prevent unwanted water production, which may increase operational costs and reduce extraction efficiency. Ideally, a solution to these challenges may involve a targeted, controllable method for blocking high-permeability zones while allowing for the continued stimulation of lower-permeability areas. Furthermore, a solution that prevents unwanted water production would be highly beneficial, as excessive water production may increase operational costs, decrease hydrocarbon output, and require additional water management measures. Current solutions generally lack the ability to intelligently respond to formation conditions in real-time, highlighting the need for a more advanced and adaptable approach to fracture diversion and water conformance.

The present disclosure addresses the foregoing challenges by providing methods for sealing high-permeability zones in subterranean formations. The methods of the present disclosure introduce a dual-functional treatment intended to potentially enhance fracture diversion and prevent unwanted water production in carbonate reservoirs. The compositions and methods herein utilize a super-absorbent polymer that may remain inactive in acidic conditions but swells significantly under neutral pH, potentially allowing for precise and controlled fluid redirection. Unlike conventional particulate diversion agents, which may prematurely block low-permeability zones, the compositions and methods of the present disclosure may ensure effective zonal coverage by selectively plugging high-permeability vugular formations and natural fractures. Additionally, if fracturing extends into a water-producing zone, the polymer may selectively absorb water while remaining inert to hydrocarbons, thereby reducing water production and potentially improving hydrocarbon yield.

Therefore, methods for sealing high-permeability zones in subterranean formations may comprise introducing a treatment fluid to a subterranean formation comprising a high-permeability zone and a low-permeability zone; wherein the treatment fluid comprises a polyacrylamide, an acid, and water; allowing the treatment fluid to enter the high-permeability zone; allowing the polyacrylamide to at least partially swell within the high-permeability zone, thereby at least partially sealing the high-permeability zone; and diverting at least a portion of the treatment fluid to the low-permeability zone.

More specifically, methods for sealing high-permeability zones and water-producing zones in subterranean formations may comprise introducing a treatment fluid to a subterranean formation comprising a high-permeability zone, a low-permeability zone, and a water-producing zone; wherein the treatment fluid comprises a polyacrylamide, an acid, and water; allowing the treatment fluid to enter the water producing zone; allowing the polyacrylamide to at least partially swell within the water-producing zone, thereby at least partially sealing the water-producing zone; allowing the treatment fluid to enter the high-permeability zone; allowing the polyacrylamide to at least partially swell within the high-permeability zone, thereby at least partially sealing the high-permeability zone; diverting at least a portion of the treatment fluid to the low-permeability zone; and allowing the acid to at least partially fracture the low-permeability zone.

As used herein, the term "high-permeability zone" refers to an area of a subterranean formation that contains at least one large channel, such as a natural fracture or vugular formation.

As used herein, the term "low-permeability zone" refers to an area of a subterranean formation that contains at least one small channel, such as a wormhole, smaller than a channel within a high-permeability zone.

As used herein, the term "water-producing zone" refers to an area of a subterranean formation that contains entrapped water.

The subterranean formations treated by the methods described herein may comprise carbonate rock. For example, such formations may predominantly comprise carbonate minerals, including but not limited to calcite, dolomite, the like, and mixtures thereof. These formations may be commonly encountered in hydrocarbon-bearing reservoirs and may be frequently targeted for acid stimulation (fracturing) treatments due to the formations' high reactivity with acidic fluids, which may enable the creation of conductive flow pathways for the hydrocarbons.

Carbonate subterranean formations may be characteristically heterogeneous and, for example, may comprise a complex network of low-permeability zones, high-permeability zones, and fluid-producing zones. In many cases, a single formation may simultaneously contain hydrocarbon-producing zones and water-producing zones, presenting operational challenges during stimulation. High-permeability features such as natural fractures and vugular porosity may promote the uncontrolled entry and rapid leakoff of treatment fluids, reducing overall stimulation efficiency. Consequently, low-permeability zones may remain unstimulated, and stimulation operations may yield suboptimal hydrocarbon production. In water-bearing formations, stimulation may also inadvertently increase water cut, necessitating costly post-treatment remediation or water handling.

The treatment methods described herein may utilize a super-absorbent polymer, such as a polyacrylamide, which may possess critical swelling properties. In the presence of water at or near neutral pH, the polyacrylamide may absorb several hundred times its own weight in water, resulting in substantial volumetric expansion. This swelling capability may allow the polymer to at least partially seal channels within the subterranean formation, including but not limited to pores, vugular zones, fractures, the like, and any combination thereof within the formation. Importantly, the polymer may remain inert and non-swelling in acidic environments, thereby enabling controlled placement prior to activation. The polymer may be crystalline, cross-linked, or partially cross-linked to achieve the desired swelling kinetics and thermal stability. Additionally, the polymer's swelling behavior may be influenced by formation temperature, fluid salinity, and exposure time, providing an additional degree of tunability in field applications.

The polymer, for example, the polyacrylamide, may be introduced to the subterranean formation as part of a treatment fluid, which may be employed for acid fracturing (matrix acidizing) operations. In addition to the polyacrylamide, the treatment fluid may comprise water and, in preferred embodiments, may comprise an acid, such as hydrochloric acid or a blend of mineral and organic acids (e.g., HCl with formic or acetic acid). Acid blends may serve as retarded systems, allowing delayed reactivity with the formation and increasing the chance of successful polymer placement. The pH of the treatment fluid prior to introduction to the subterranean formation, for example, may be about 0 to about 2 (or about 0 to about 1.5, or about 0 to about 1, or about 0 to about 0.5, or about 0.5 to about 2, or about 0.5 to about 1.5, or about 0.5 to about 1, or about 1 to about 2, or about 1 to about 1.5, or about 1.5 to about 2), which may prevent premature swelling of the polyacrylamide. The concentration of the polyacrylamide in the treatment fluid, for example, may be about 0.1 wt % to about 1 wt % (or about 0.1 wt % to about 0.8 wt %, or about 0.1 wt % to about 0.6 wt %, or about 0.1 wt % to about 0.4 wt %, or about 0.4 wt % to about 1 wt %, or about 0.4 wt % to about 0.8 wt %, or about 0.4 wt % to about 0.6 wt %), potentially depending on subterranean formation characteristics and desired sealing performance.

Upon introduction into the formation, the treatment fluid may preferentially enter a high-permeability zone due to lower resistance to flow. As the acid within the fluid reacts with the carbonate mineral, the acid may become neutralized, gradually increasing the local pH. This pH change may activate the polyacrylamide, causing the polyacrylamide to swell and at least partially seal the high-permeability zone. This swelling may divert the remaining treatment fluid, including any unspent acid, into a low-permeability zone, where the acid may fracture or further stimulate the formation. This mechanism may potentially improve zonal coverage and hydrocarbon recovery by targeting previously untreated zones. In some embodiments, the fluid may be introduced using bullheading or coiled tubing deployment techniques to maximize contact with target zones prior to polymer activation.

In subterranean formations that include water-producing zones, the treatment fluid may also enter these zones. Upon contact with a formation water, the polyacrylamide in the treatment fluid may absorb the formation water and swell, thereby at least partially sealing the water-producing zone. The polymer may remain un-swollen in response to contact with hydrocarbons, ensuring selective activation in the presence of water. This at least partial sealing of the water-producing zone may reduce or possibly eliminate unwanted water production, potentially improving the overall efficiency of the stimulation treatment and post-treatment hydrocarbon output. The polymer's selectivity for aqueous fluids and rejection of hydrocarbons may arise from its hydrophilic nature and polymer-solvent interactions.

In any embodiment, the treatment fluid may also include one or more additives to enhance properties such as performance or stability. Such additives may include but are not limited to corrosion inhibitors, intensifiers, iron stabilizers, chelating agents (chelants), the like, and any combination thereof.

Corrosion inhibitors may be added to the treatment fluid to protect downhole equipment from acid-induced corrosion. Example corrosion inhibitors include but are not limited to propargyl alcohol derivatives (e.g., BASF Baso-Corr®), film-forming amines, quaternary ammonium compounds, imidazolines and imidazoline derivatives, aromatic amines, sulfur- and phosphorus-containing compounds, the like, and any combination thereof. These inhibitors may be selected based on their thermal stability, compatibility with other additives, and effectiveness in low-pH environments.

Intensifiers may improve the effectiveness of the corrosion inhibitors under high-temperature conditions. Example intensifiers include but are not limited to, halide salts (e.g., potassium iodide, sodium iodide, or ammonium iodide), aromatic or heterocyclic compounds, organosulfur compounds, polyalkylene glycols, transition metal complexes, the like, and any combination thereof. These materials may help maintain the integrity of inhibitor films and ensure consistent corrosion protection in challenging downhole conditions.

Iron precipitation may be prevented by including an iron stabilizer in the treatment fluid. Example iron stabilizers include but are not limited to reducing agents (e.g., sodium erythorbate, as in SLB L058), organic acids and organic acid salts (e.g., citric acid, gluconic acid), phosphonate compounds (e.g., aminotris(methylenephosphonic acid)), the like, and any combination thereof. Reducing agents may maintain iron in its ferrous ($Fe^{2+}$) state, which is more soluble and less prone to forming damaging precipitates compared to the ferric ($Fe^{3+}$) state.

Chelants may further complex metal ions and further inhibit scale formation or precipitation when added to the treatment fluid. Example chelants include but are not limited to ethylenediaminetetraacetic acid (EDTA) and EDTA derivatives (e.g., SLB L041), diethylenetriaminepentaacetic acid (DTPA) and DTPA derivatives, nitrilotriacetic acid, citric acid, gluconic acid, oxalic acid, the like, and any combination thereof. Chelants may serve multiple functions, including sequestration of multivalent cations (e.g., $Fe^{3+}$, $Ca^{2+}$, $Mg^{2+}$) and preservation of fluid clarity and injectivity throughout the treatment.

The present disclosure is further directed to the following non-limiting clauses:

Clause 1. A method comprising:
    introducing a treatment fluid to a subterranean formation comprising a high-permeability zone and a low-permeability zone;
        wherein the treatment fluid comprises a polyacrylamide, an acid, and water;
    allowing the treatment fluid to enter the high-permeability zone;

6 allowing the polyacrylamide to at least partially swell within the high-permeability zone, thereby at least partially sealing the high-permeability zone; and
    diverting at least a portion of the treatment fluid to the low-permeability zone.
Clause 2. The method of clause 1, wherein the acid comprises hydrochloric acid.
Clause 3. The method of clause 1 or clause 2, further comprising:
    allowing the acid to at least partially fracture the low-permeability zone.
Clause 4. The method of any one of clauses 1-3, wherein the subterranean formation further comprises a water-producing zone.
Clause 5. The method of clause 4, further comprising:
    allowing the treatment fluid to enter the water-producing zone.
Clause 6. The method of clause 5, further comprising:
    allowing the polyacrylamide to swell upon contact with a formation water within the water-producing zone, thereby at least partially sealing the water-producing zone.
Clause 7. The method of any one of clauses 1-6, wherein the treatment fluid further comprises a corrosion inhibitor, an intensifier, an iron stabilizer, a chelant, or any combination thereof.
Clause 8. The method of any one of clauses 1-7, wherein the treatment fluid has a concentration of the polyacrylamide of about 0.1 wt % to about 1 wt %.
Clause 9. The method of any one of clauses 1-8, wherein a pH of the treatment fluid prior to introducing the treatment fluid to the subterranean formation is about 0 to about 2.
Clause 10. The method of any one of clauses 1-9, wherein the subterranean formation comprises a carbonate mineral.
Clause 11. A method comprising:
    introducing a treatment fluid to a subterranean formation comprising a high-permeability zone, a low-permeability zone, and a water-producing zone;
        wherein the treatment fluid comprises a polyacrylamide, an acid, and water;
    allowing the treatment fluid to enter the water-producing zone;
    allowing the polyacrylamide to at least partially swell within the water-producing zone, thereby at least partially sealing the water-producing zone;
    allowing the treatment fluid to enter the high-permeability zone;
    allowing the polyacrylamide to at least partially swell within the high-permeability zone, thereby at least partially sealing the high-permeability zone;
    diverting at least a portion of the treatment fluid to the low-permeability zone; and
    allowing the acid to at least partially fracture the low-permeability zone.
    Clause 12. The method of clause 11, wherein the treatment fluid further comprises a corrosion inhibitor, an intensifier, an iron stabilizer, a chelant, or any combination thereof.
Clause 13. The method of clause 11 or clause 12, wherein the treatment fluid has a concentration of the polyacrylamide of about 0.1 wt % to about 1 wt %.
Clause 14. The method of any one of clauses 11-13, wherein a pH of the treatment fluid prior to introducing the treatment fluid to the subterranean formation is about 0 to about 2.

Clause 15. The method of any one of clauses 11-14, wherein the subterranean formation comprises a carbonate mineral.

EXAMPLES

Two experiments were conducted to evaluate the performance of polyacrylamide in acid fracturing fluids, specifically the polymer's behavior under acid and neutral pH conditions. These experiments aimed to confirm that polyacrylamide remains inactive during fracturing operations and later swells to block high-permeability zones and prevent unwanted water production.

In the first experiment, the stability of polyacrylamide in acidic conditions was observed to ensure the polymer would not swell prematurely. Crystalline polyacrylamide (1 mm average diameter; 4 grams) was added to 1000 mL of a single-phase acid containing 12.4 vol % hydrochloric acid, 40 vol % BasoMSA methanesulfonic acid (BASF), 2 vol % BasoCorr PP corrosion inhibitor (BASF), 7 vol % potassium iodide, 0.4 vol % L058 iron stabilizer (SBL), 5 vol % L041 chelant (SLB), and 33.2 vol % water. The solution was left for two hours before being vacuum filtered. Following filtration, 970 mL of filtrate volume remained and the pH of the solution was less than 0, confirming that the polyacrylamide did not swell under the acidic conditions. This indicated that the polyacrylamide may remain inactive during the initial acid fracturing stage, ensuring proper placement before activation.

In the second experiment, the polyacrylamide's ability to swell and block high-permeability zones was tested under neutralized conditions to simulate post-fracturing environments. The same polymer-acid mixture was used, but the acid was neutralized using calcium carbonate powder, bringing the pH to approximately 7. The solution was then kept for two hours before being vacuum filtered. The results demonstrated a significant reduction in the filtrate volume (60 mL), indicating that the polymer absorbed water and swelled, which may effectively block fluid flow. The final pH was 6.8, confirming that swelling only occurred under neutral conditions.

These results potentially validate the dual-functionality of the polyacrylamide in fracture diversion and water conformance. By remaining inactive in acidic conditions, the polyacrylamide may ensure proper placement during fracturing, and upon neutralization, the polymer may well to divert acid to lower-permeability zones and seal off water-producing areas. This controlled activation mechanism may enhance hydrocarbon recovery while preventing unwanted water production, making this method a potential alternative to conventional particulate diversion methods.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:

introducing a treatment fluid to a subterranean formation comprising a high-permeability zone, a low-permeability zone, and a water-producing zone;

wherein the treatment fluid comprises a polyacrylamide, an acid, and water;

allowing the treatment fluid to enter the water-producing zone;

allowing the polyacrylamide to at least partially swell within the water-producing zone, thereby at least partially sealing the water-producing zone;

allowing the treatment fluid to enter the high-permeability zone;

allowing the polyacrylamide to at least partially swell within the high-permeability zone, thereby at least partially sealing the high-permeability zone;

diverting at least a portion of the treatment fluid to the low-permeability zone; and allowing the acid to at least partially fracture the low-permeability zone.

2. The method of claim 1, wherein the treatment fluid further comprises a corrosion inhibitor, an intensifier, an iron stabilizer, a chelant, or any combination thereof.

3. The method of claim 1, wherein the treatment fluid has a concentration of the polyacrylamide of about 0.1 wt % to about 1 wt %.

4. The method of claim 1, wherein a pH of the treatment fluid prior to introducing the treatment fluid to the subterranean formation is about 0 to about 2.

5. The method of claim 1, wherein the subterranean formation comprises a carbonate mineral.

6. The method of claim 1, wherein the acid comprises hydrochloric acid.

* * * * *